United States Patent [19]
Mehta

[11] Patent Number: 6,080,489
[45] Date of Patent: Jun. 27, 2000

[54] THERMOPLASTIC POLYMERS MODIFIED WITH SILOXANE BLENDS

[75] Inventor: Veerag Yagnik Mehta, Midland, Mich.

[73] Assignee: Dow Corning Corporation, Midland, Mich.

[21] Appl. No.: 09/225,134

[22] Filed: Jan. 4, 1999

[51] Int. Cl.[7] ...................................................... B32B 9/04
[52] U.S. Cl. ........................ 428/447; 524/267; 525/106; 264/331.15; 264/331.11; 264/176.1; 521/79
[58] Field of Search ............................ 525/106; 524/267; 264/331.15, 331.11, 176.1; 521/79; 428/447, 446

[56] References Cited

U.S. PATENT DOCUMENTS

| | | | |
|---|---|---|---|
| 5,708,084 | 1/1998 | Hauenstein et al. | 525/102 |
| 5,708,085 | 1/1998 | Hauenstein et al. | 525/106 |

*Primary Examiner*—Robert Dawson
*Assistant Examiner*—Kuo-Liang Peng
*Attorney, Agent, or Firm*—Alex Weitz

[57] ABSTRACT

The present invention therefore relates to a composition comprising:

(A) 100 parts by weight of a thermoplastic resin (A); and
(B) at least 0.5 part by weight of a siloxane blend (B) consisting essentially of 50–99% by weight of the siloxane blend of a high molecular weight siloxane having a viscosity of greater than 60 Pa.s and 1–50% by weight of the siloxane blend of a low molecular weight siloxane having a viscosity of 10 to 330 Pa.s, wherein said high molecular weight siloxane has a viscosity greater than the viscosity of said low molecular weight siloxane.

These compositions exhibit surprisingly improved properties, such as having reduced coefficient of friction, consistent coefficient of friction over time, increased hydrophobicity and improved abrasion resistance.

23 Claims, No Drawings

THERMOPLASTIC POLYMERS MODIFIED WITH SILOXANE BLENDS

FIELD OF THE INVENTION

The present invention relates to thermoplastic compositions. More particularly, the invention relates to compositions having reduced coefficient of friction, consistent coefficient of friction over time, increased hydrophobicity, and improved abrasion resistance.

BACKGROUND OF THE INVENTION

Silicone based process aids are well know in the art. For example, U.S. Pat. Nos.: 5,708,084 and 5,708,085 teach polyolefin compositions which can be extruded at relatively high rates to provide extrudate having increased hydrophobicity, said compositions comprising (A) 100 parts by weight of a thermoplastic resin; (B) 1 to 5 parts by weight of an interactive diorganopolysiloxane process aid, said diorganopolysiloxane having a number average molecular weight of at least 10,000.

SUMMARY OF THE INVENTION

It has now been found that, when a small quantity of a siloxane blend is added to a thermoplastic resin considerably improved properties are obtained.

The present invention therefore relates to a composition comprising:

(A) 100 parts by weight of a thermoplastic resin (A); and
(B) at least 0.5 part by weight of a siloxane blend (B) consisting essentially of 50–99% by weight of the siloxane blend of a high molecular weight siloxane having a viscosity of greater than 60 Pa.s and 1–50% by weight of the siloxane blend of a low molecular weight siloxane having a viscosity of 10 to 330 Pa.s, wherein said high molecular weight siloxane has a viscosity greater than the viscosity of said low molecular weight siloxane.

These compositions exhibit surprisingly improved properties, such as having reduced coefficient of friction, consistent coefficient of friction over time, increased hydrophobicity and improved abrasion resistance.

DETAILED DESCRIPTION OF THE INVENTION

The thermoplastic resins that constitute the component (A) of the invention are preferably polyolefins, but can be other thermoplastic resins as well, such as nylons, polyesters, polystyrenes, polyurethanes and acrylic resins, among others. As used herein, the term "thermoplastic resin" is meant to include those polymers which soften when exposed to heat and then return to original condition when cooled to room temperature. In the case where the thermoplastic resin is a polyolefin, it may be selected from homopolymers of olefins as well as interpolymers of one or more olefins with each other and/or up to about 40 mole percent of one or more monomers which are copolymerizable with the olefins. Examples of suitable polyolefins include homopolymers of ethylene, propylene, butene-1, isobutylene, hexene, 1,4-methylpentene-1, pentene-1, octene-1, nonene-1 and decene-1, inter alia. Interpolymers of two or more of the above mentioned olefins may also be employed as component (A) and they may also be copolymerized with, e.g., vinyl or diene compounds or other such compounds which can be copolymerized with the olefins. Specific examples of suitable interpolymers are ethylene-based copolymers, such as ethylene-propylene copolymers, ethylene-butene-1 copolymers, ethylene-hexene-1 copolymers, ethylene-octene-1 copolymers, ethylene-butene-1 copolymers and interpolymers of ethylene with two or more of the above mentioned olefins.

Component (A) may also be a blend of two or more of the above mentioned homopolymers or interpolymers. For example, the blend can be a uniform mixture of one of the above systems with one or more of the following: polypropylene, high pressure low density polyethylene, high density polyethylene, polybutene-1 and polar monomer-containing olefin copolymers such as ethylene/acrylic acid copolymers, ethylene/acrylic acid copolymers, ethylene/methyl acrylate copolymers, ethylene/ethyl acrylate copolymers, ethylene/vinyl acetate copolymers, ethylene/acrylic acid/ethyl acrylate terpolymers and ethylene/acrylic acid/vinyl acetate terpolymers, inter alia.

Preferably, these systems have a density of about 0.850 to 1.400 g/cc, more preferably 0.875 to 0.960 g/cc, and weight average molecular weight of about 60,000 to about 200,000. The thermoplastic resin (A) may be made by any methods known in the art, such as using Ziegler Natta type catalysts and metalocence based catalysts i.e single site catalysts, or may be produced by a condensation type polymerization.

The above polymers are well known in the art and further description thereof is considered unnecessary.

The siloxane blend (B) consists essentially of 50–99% by weight of the siloxane blend of a high molecular weight siloxane having a viscosity of greater than 60 Pa.s and 1–50% by weight of the siloxane blend of a low molecular weight siloxane having a viscosity of 10 to 330 Pa.s. The high molecular weight siloxane has a viscosity greater than the viscosity of said low molecular weight siloxane.

The high molecular weight siloxane of the siloxane blend has a number average molecular weight (Mn) of at least about 60,000, and a viscosity of at least 60 Pa.s. Preferably, the Mn of the high molecular weight siloxane is about 75,000 to about 2,000,000 and more preferably about 250,000 to about 550,000. Preferred viscosities of the high molecular weight siloxane are from 100 to $2 \times 10^8$ Pa.s, more preferably 1,100 to 30,000 Pa.s.

The low molecular weight siloxane of the siloxane blend has a number average molecular weight (Mn) of from 40,000 to 105,000, and a viscosity of from 10 to 330 Pa.s. Preferably, the Mn of the low molecular weight siloxane is about 50,000 to about 80,000 and more preferably about 55,000 to about 75,000. Preferred viscosities of the low molecular weight siloxane are from 15 to 125 Pa.s, more preferably 30 to 100 Pa.s.

The high and low molecular weight siloxanes that constitute Component (B) may be linear or branched polymers or copolymers wherein the organic groups are independently selected from methyl or phenyl radicals. Suitable siloxanes include polydimethylsiloxane homopolymers, copolymers consisting essentially of dimethylsiloxane units and methylphenylsiloxane units, copolymers consisting essentially of dimethylsiloxane units and diphenylsiloxane units, copolymers consisting essentially of diphenylsiloxane units and methylphenylsiloxane units, and homopolymers of methylphenylsiloxane units. Mixtures of two or more such polymers or copolymers may be employed for either the high or low molecular weight siloxanes.

For the purposes of the present invention the high and low molecular weight siloxanes (B) must contain at least 1, but preferably 2 or more, interactive groups in the molecule, such as hydroxyl, methyl, fluoro, carboxylic acid, nitrogen, alkylenyl groups. As used herein the term "interactive" refers to the tendency of the group to attracted to a metal surface, such as extrusion die. Most preferred are hydroxyl groups. The interactive groups may be located at the ends of the molecule, or they may be distributed along the chain or they may be located both at the ends as well as along the chain. Preferably, the interactive groups reside at the molecular chain ends of the siloxanes, as in the case of hydroxyl, in the form of diorganohydroxysiloxy groups, such as dimethylhydroxysiloxy, diphenylhydroxysiloxy, and methylphenylhydroxysiloxy, inter alia. When the interactive groups are located only along the chain, the terminal groups of the diorganopolysiloxane may be any non-reactive moiety, typically a di or triorganosiloxy species such as dimethylvinylsiloxy or trimethylsiloxy.

It is preferred that the high and low molecular weight siloxanes (B) are linear polydimethylsiloxanes containing up to about 50 mole percent of methyl radicals. Most preferably, they are polydimethylsiloxane homopolymer having dimethylhydroxysiloxy end groups.

The compositions of the present invention are prepared by thoroughly dispersing at least 0.5 part by weight of diorganopolysiloxane (B) in 100 parts by weight of thermoplastic (A). Higher amounts of component (B) (up to 50 parts) can be used to form a masterbatch (or concentrate) of the composition for further processing. For finished products, it is preferred that about 0.5 to about 7 parts by weight of component (B) are used for each 100 parts by weight of component (A). More preferably, about 1 to 4 parts of (B), and most preferably about 1 to 3 parts, per 100 parts by weight of (A) are used. As used herein, the term "coefficient of friction" means the constant by which the normal force is multiplied by in the following equation:

$$F = fN$$

where F=force required to pull an object with a weight or normal force of N perpendicular to the acting normal force. A lubricated surface would cause the value of "f" to be less than 1.

Thus, the above recited preferred compositional ranges result in the desired balance of good coefficient of friction as well as low screw slip during processing, particularly at high extruder output rates.

The dispersion of (B) into thermoplastic resin (A) may be accomplished by any of the traditional means for mixing additives into thermoplastic resin at elevated temperature. For example, the two components may be blended in a twin-screw extruder, a Banbury mixer, a two-roll mill or a single-screw extruder, either with or without a mixing head. The equipment used to mix these component is thus not critical as long as a uniform dispersion of (B) in (A) is attained. Preferably the dispersed particle size is no larger than about 40 micrometers.

It is contemplated that many of the compositions of the present invention will be processable in conventional extrusion equipment. When the compositions are to be extruded, the molecular weight of component (B) will influence the processing characteristics of the composition. When the molecular weight is below about 10,000 the compositions tend to exhibit screw slipage, i.e., lower output than expected for a given RPM of an single screw extruder.

In addition to the above components, compositions of the present invention may also contain up to about 30 percent by weight of each of the following: fillers, cure agents, lubricants, ultraviolet light stabilizers, antioxidants, catalyst stabilizers, flame retardants and other process aids commonly employed in the modification of polyolefins. Moreover, up to 2% by weight of their total composition of the present invention could be an antiblock agent, and flame retardants can make up 30% of the total composition. Specific non-limiting examples of the above additional ingredients include the following substances. Diatomaceous earth, octadecyl-3-(3,5-di-5-butyl 4-hydroxyphenyl) propionate, bis(2-hydroxyethyl) tallowamine, calcium stearate, N,N-bis(2,2,6,6-tetramethyl-4-piperidinyl)-1,6-hexanediamine polymer with 2,4,6-trichloro-1,3,5-triazine and 2,4,6-trichloro-1,3,5-triazine and 2,4,4-trimethyl 1,2-pentanamine, dimethyl succinate polymer with 2,2,6,6-tetramethyl-1-piperridineethanol,2,2-thiobis)4-tert-octylphenolato]n-butylamine nickel, tris(2,4-di-tert-butylphenyl)phoshite, bis(2,4-di-t-butylphenyl) pentaerythritol diphosphite, trisnonylphenylphospite, polyethylene glycol, Erucamide, titanium dioxide, titanium dioxide, alumina, hydrated alumina, talc, 2-hydroxy-4-n-octyloxy-benzophenone, silicone dioxide, zinc oxide, zinc sulfide, and zinc stearate.

According to the method of the present invention, the above described siloxane blend (B) is added to the thermoplastic resin (A) and serves as a surface modifier and therefor when the resin is processed at an elevated temperature, the resulting extrudate has a reduced coefficient of friction, consistent coefficient of friction over time, and improved abrasion resistance over films not containing siloxane blend (B). This method is particularly applicable to the production of cast film or blown film, but also finds utility in sheet molding, extrusion blow molding; injection stretch blow molding; injection molding; pipe, wire, or cable extrusion; fiber production; calendering; and any similar high shear melt processing of polyolefin resins, all of these techniques being well known in the art. According to the method of the present invention, the above described siloxane blend (B) is added to the resin (A) and serves as a melt additive therefor when the resin is extruded at elevated temperatures to form a shaped product (e.g., a cylindrical cross-section, as a film, ribbon, bar, annulus, fiber, sheet, or the like). The resulting extrudate has a reduced coefficient of friction and increased hydrophobicity relative to a similar extrudate which does not contain component (B). This method is particularly applicable to the production of cast film or blown film, but also finds utility in extrusion blow molding; injection molding; pipe, wire, or cable extrusion; fiber production; and any similar high shear melt processing of polyolefin resins, all of these techniques being well known in the art.

Although it is possible to obtain a relatively uniform dispersion by injecting component (B) into the screw section of an extruder while polyolefin pellets are fed in through the hopper thereof, it is preferred to first thoroughly disperse component (B) in a portion of component (A) to form a masterbatch. This masterbatch (or concentrate), which preferably contains about 0.5 to 50, more preferably 20 to 50, weight percent of the siloxane blend, may be ground up or pelletized, the resulting particulate dry-blended with additional thermoplastic (the matrix) and this blend then extruded or injected to form a composition of the invention. Use of this masterbatch technique results in a more uniform dispersion of the siloxane blend in the thermoplastic matrix. The skilled artisan will recognize that separate masterbatches of the high and low molecular weight siloxanes may be combined in the extruder or preblended then added to the extruder to obtain appropriate proportions of the high molecular weight siloxane and low molecular weight siloxane.

The thermoplastic used in the preparation of the above described masterbatch may be the same as, or different from, the matrix thermoplastic resin. Preferably, the two are of the same general type (e.g., polypropylene in the masterbatch and in the matrix).

The present invention results in reduced coefficient of friction, consistent coefficient of friction over time, increased hydrophobicity and improved abrasion resistance. Some of these improved properties are illustrated by the examples below.

EXAMPLES

The following examples are presented to further illustrate the compositions and method of this invention, but are not to be construed as limiting the invention, which is delineated in the appended claims. All parts and percentages in the examples are on a weight basis and all measurements were obtained at about 25° C., unless indicated to the contrary.

Materials

LLDPE—a linear low density polyethylene with hexene co-monomer having a density of 0.918 g/cc and marketed as TF-0119-F by Nova Chemical (Lemester, Mass.).

Plastomer—Exact 3125—density=0.902 Exxon Chemical Company (Houston, Tex.).

Plastomer—Affinity PF1140—density=0.896 Dow Chemical Company (Midland, Mich.) "PDMS" as used herein means "polydimethylsiloxane".

Example 1

On a Killion (Ceder Grove, N.J.) blown film line a film was fabricated through a 6.35 cm electroless nickel plated die with a die gap of 0.0381 cm resulting in a 0.00381 cm thick film with a layflat of 15.25 cm. Film was produced at a rate of 25.5 cm/minute. The material was fed by a Killion (Ceder Grove, N.J.) KL100 a 2.54 cm extruder with a general purpose screw with a Maddox mixer. The material processed was a LLDPE-Nova TF-0119-F with 1000 ppm of diatomaceous earth antiblock and the silicone additives described below.

The diatomaceous earth masterbatch was Ampacet (Tarrytown, N.Y.) 10063 a 20% concentrate of diatomaceous earth in an 8 melt flow index liner low density polyethylene. The silicone additives were provided through two masterbatches. The first masterbatch was a 20% concentrate of Silicone A, a $4.4 \times 10^5$ molecular weight (viscosity 15,000 Pa.s) hydroxyl terminated PDMS in a 0.918 density, 6 melt flow index LLDPE. The second was a 20% concentrate of Silicone B, a $6 \times 10^4$ molecular weight (viscosity 60 Pa.s) hydroxyl terminated PDMS in a 0.918 density, 6 melt flow index LLDPE. First the film was made using 5% Silicone A masterbatch for a final loading of 1% Silicone A by weight of the Nova TF-0119-F LLDPE. The same film was then made using 4.5% Silicone A masterbatch and 0.5% Silicone B masterbatch for an effective additive level of 1% by weight of the LLDPE resin. All the materials were dry blended by hand in the proper proportions and then fed into the hopper of the extruder. The heating zones on the extruder and die were set as follows:

Zone 1: 177° C. Zone 2: 180° C. Zone 3: 183° C.

Clamp Ring: 186° C. Die 1: 186° C. Die 2: 188° C.

The RPM was set at 40 and the frost line was at 5 cm.

The film with the silicone blend had a coefficient of friction lower than that of Silicone A. The coefficient of friction was measured on a Testing Machines, Inc. (Islandia, N.Y.) Monitor Slip and Friction Tester as per ASTM D-1894.

Also, the film processed without the typical screw slippage problems associated with processing materials like Silicone B. Table 1 shows the difference in kinetic film to film COF

TABLE 1

| Silicone A | Silicone B | Kinetic COF |
|---|---|---|
| 0 | 0 | 1.047 |
| 1% | 0 | 0.454 |
| 0.9% | 0.1% | 0.250 |

The blend of Silicone A and Silicone B showed an almost 100% improvement in Kinetic COF over the film having only Silicone A as an additive.

Example 2

On a Killion (Ceder Grove, N.J.) blown film line a film was fabricated through a 6.35 cm electroless nickel plated die with a die gap of 0.0381 cm resulting in a 0.0038 cm thick film with a layflat of 15.24 cm. Film was produced at a rate of 25.4 cm/minute. The material was fed by a Killion (Ceder Grove, N.J.) KL100 a 2.54 cm extruder with a general purpose screw and a Maddox mixer. Exxon Exact 3125 was processed with 2000 ppm of a sodium-aluminum silicate as antiblock and the silicone additives described below.

The silicone additives were provided through two masterbatches. The first masterbatch was a 20% concentrate of Silicone A, a $4.4 \times 10^5$ molecular weight hydroxyl terminated PDMS in a 0.918 density, 6 melt flow index LLDPE. The second was a 20% concentrate of Silicone B, a $6 \times 10^4$ molecular weight hydroxyl terminated PDMS in a 0.918 density, 6 melt flow index LLDPE. First the film was made using 5% Silicone A masterbatch for a final loading of 1% Silicone A by weight of the Exact 3125 plastomer.

The same film was then made using 4.5% Silicone A masterbatch and 0.5% Silicone B masterbatch for an effective additive level of 1% by weight of the Exact 3125 plastomer resin. All the materials were dry blended by hand in the proper proportions and then fed into the hopper of the extruder. The heating zones on the extruder and die were set as follows: Zone 1: 186° C. Zone 2: 189° C. Zone 3: 192° C.

Clamp Ring: 195° C. Die 1: 192° C. Die 2: 189° C.

The RPM was set at 40 and the frost line was at 5 cm.

The plastomer film with the silicone blend had a coefficient of friction lower than that of Silicone A. The coefficient of friction was measured on a Testing Machines, Inc. (Islandia, N.Y.) Monitor Slip and Friction Tester as per ASTM D-1894. Also, the film processed without the typical screw slippage problems associated with processing materials like Silicone B. Table 1 shows the difference in kinetic film to film COF.

TABLE 2

| Silicone A | Silicone B | Kinetic COF |
|---|---|---|
| 0 | 0 | greater than 1 - cannot measure |
| 1% | 0 | 0.573 |
| 0.9% | 0.1% | 0.380 |

Again, the blend of Silicone A and Silicone B showed a significant improvement in Kinetic COF over the film having only Silicone A as an additive.

Example 3

On a 35.6 cm Killion 3-layer coextrusion cast film line, a coextruded film was extruded through a stainless steel die with a 0.0508 cm die gap. Prior to the die there was an A/B/C feedblock which allowed for a layer distribution of 15%/70%/15% when the film was extruded. The two 15% layers were extruded using two Killion KTS100's and the 70% layer was fed by a Killion KL125. Layers A and B were made using a Nova TF-0119-F LLDPE with no additives incorporated at the film extruder. Both extruders had general purpose screws with Maddox mixers. The temperature profile on each extruder was as follows:

Zone 1: 243° C. Zone 2: 246° C. Zone 3: 249° C. Clamp Ring: 249° C.

The C layer or commonly called the seal layer contained Affinity PF1140 resin. This material was extruded by a 2.54 cm extruder with a barrier screw design and Maddox mixer. The temperature profile on the extruder is as follows:

Zone 1: 249° C. Zone 2: 252° C. Zone 3: 255° C. Clamp Ring: 249° C.

All the die zones were set at 243° C. The resultant film had a thickness of 0.00381 cm and was produced at a rate of 102 cm/minute. The screw RPM on the KTS100's was 20 and the KL125 was 30.

The silicone additives were provided through two masterbatches. The first masterbatch was a 25% concentrate of Silicone A, a $4.4 \times 10^5$ molecular weight hydroxyl terminated PDMS in a 0.918 density, 6 melt flow index LLDPE. The second was a 20% concentrate of Silicone B, a $6 \times 10^4$ molecular weight hydroxyl terminated PDMS in a 0.918 density, 6 melt flow index LLDPE. First the film was made using 8% Silicone A masterbatch for a final loading of 2% Silicone A by weight of the Affinity PF1140 plastomer. The same film was then made using 5.2% Silicone A masterbatch and 0.8% Silicone B masterbatch for an effective additive level of 1.5% by weight of the Affinity PF1140 plastomer resin. All the materials were dry blended by hand in the proper proportions and then fed into the hopper of the extruder.

One of the benefits of using the blend of silicones for film processing over single MW silicones is slip efficacy. The blend allows for a lower addition level of total silicone while providing the same benefit. At a constant loading level of a diatomaceous earth antiblock the following results were obtained.

TABLE 3

| Silicone A | Silicone B | Kinetic COF - Affinity Skin |
|---|---|---|
| 0 | 0 | Greater than 1 - cannot measure |
| 2% | 0 | 0.320 |
| 1.3% | 0.2% | 0.306 |

What is claimed is:

1. A composition comprising:
   (A) 100 parts by weight of a thermoplastic resin;
   (B) at least 0.5 part by weight of a siloxane blend (B) consisting essentially of 50–99% by weight of the siloxane blend of a high molecular weight siloxane having a viscosity of greater than 60 Pa.s and 1–50% by weight of the siloxane blend of a low molecular weight siloxane having a viscosity of 10 to 330 Pa.s, wherein said high molecular weight siloxane has a viscosity greater than the viscosity of said low molecular weight siloxane.

2. The composition according to claim 1, wherein said high and low molecular weight siloxanes are linear hydroxy-terminated polydimethylsiloxanes and said thermoplastic resin (A) is polyethylene or polypropylene.

3. The composition according to claim 1, wherein said thermoplastic resin (A) is blended with a polyethylene.

4. The composition according to claim 1, wherein the number average molecular weight of said high molecular weight siloxane is 60,000 to 2,000,000, and hydroxyl terminated.

5. The composition according to claim 1, wherein the number average molecular weight of said low molecular weight siloxane is 40,000 to 105,000, and hydroxyl terminated.

6. The composition according to claim 1, wherein siloxane blend (B) is present in an amount from 0.5 to 7 parts by weight of thermoplastic resin (A).

7. The composition according to claim 1, wherein said high or low molecular weight siloxane has at least one pendant or terminal carboxylic acid group.

8. The composition according to claim 1, wherein said high or low molecular weight siloxane has at least one pendant or terminal amine group.

9. The composition according to claim 1, wherein said high or low molecular weight siloxane has at least one pendant or terminal vinyl group.

10. A film comprising the composition of claim 1.

11. A film comprising the composition of claim 6.

12. In a method of processing a thermoplastic resin in which a melt additive is added to the thermoplastic resin to facilitate processing thereof, the improvement comprising adding a siloxane blend (B) consisting essentially of 50–99% by weight of the siloxane blend of a high molecular weight siloxane having a viscosity of greater than 60 Pa.s and 1–50% by weight of the siloxane blend of a low molecular weight siloxane having a viscosity of 10 to 330 Pa.s, wherein said high molecular weight siloxane has a viscosity greater than the viscosity of said low molecular weight siloxane; and processing the resin through a die, whereby the resulting thermoplastic resin exhibits a reduced coefficient of friction.

13. The method according to claim 12, wherein the number average molecular weight of said high molecular weight is 75,000 to 550,000 and the number average molecular weight of said low molecular weight siloxane is from 40,000 to 105,000, and the siloxane blend (B) is from 0.5 to 7 parts by weight for each 100 parts by weight of said thermoplastic resin (A).

14. In a method of processing a thermoplastic resin in which a melt additive is added to the thermoplastic resin to modify the surface coefficient of friction, the improvement comprising adding a melt additive which is a uniform blend of
   (i) a siloxane blend (B) consisting essentially of 50–99% by weight of the siloxane blend of a high molecular weight siloxane having a viscosity of greater than 60 Pa.s and 1–50% by weight of the siloxane blend of a low molecular weight siloxane having a viscosity of 10 to 330 Pa.s, wherein said high molecular weight siloxane has a viscosity greater than the viscosity of said low molecular weight siloxane; and
   (ii) a thermoplastic resin (A) to
   (iii) an additional quantity of said thermoplastic resin, whereby the resulting processed thermoplastic resin is processed through a die, and the processed resin exhibits reduced coefficient of friction relative to the unmodified thermoplastic resin.

15. The method according to claim 14, wherein said high molecular weight siloxane or said low molecular weight siloxane is a hydroxy-terminated polydimethylsiloxane.

16. The method according to claim 12 wherein the resulting processed thermoplastic resin is subjected to a film blowing step.

17. The method according to claim 12, wherein the resulting processed thermoplastic resin is subjected to a cast film step.

18. The method according to claim 14, wherein the resulting processed thermoplastic resin is subjected to a film blowing step.

19. The method according to claim 14, wherein the resulting processed thermoplastic resin is subjected to a cast film step.

20. Shaped or extruded products of the composition according to claim 1.

21. Shaped or extruded products of the composition according to claim 2.

22. Shaped or extruded products of the composition according to claim 5.

23. Shaped or extruded products of the composition according to claim 6.

* * * * *